(12) United States Patent
Fleischer et al.

(10) Patent No.: US 10,319,133 B1
(45) Date of Patent: Jun. 11, 2019

(54) POSING ANIMATION HIERARCHIES WITH DYNAMIC POSING ROOTS

(75) Inventors: Kurt Fleischer, Piedmont, CA (US); Warren Trezevant, Oakland, CA (US); Andrew Witkin, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 13/295,094

(22) Filed: Nov. 13, 2011

(51) Int. Cl.
*G06T 13/00* (2011.01)
*G06T 13/40* (2011.01)

(52) U.S. Cl.
CPC .................................. *G06T 13/40* (2013.01)

(58) Field of Classification Search
None
See application file for complete search history.

(56) References Cited

U.S. PATENT DOCUMENTS

| | | | | |
|---|---|---|---|---|
| 6,191,798 | B1 * | 2/2001 | Handelman | G06T 13/40 345/473 |
| 7,693,867 | B2 * | 4/2010 | Jensen et al. | 345/473 |
| 7,859,540 | B2 * | 12/2010 | Dariush | 345/474 |
| 7,904,202 | B2 * | 3/2011 | Hoppe | B25J 9/1692 700/245 |
| 8,237,719 | B1 * | 8/2012 | Trezevant | G06T 13/00 345/473 |
| 2005/0253846 | A1 * | 11/2005 | Russ et al. | 345/473 |
| 2006/0274068 | A1 * | 12/2006 | Barthelet | 345/473 |
| 2006/0274070 | A1 * | 12/2006 | Herman | A63F 13/10 345/474 |
| 2010/0214313 | A1 * | 8/2010 | Herman | A63F 13/10 345/474 |
| 2012/0172126 | A1 * | 7/2012 | Padovani et al. | 463/36 |
| 2012/0327090 | A1 * | 12/2012 | Yu et al. | 345/473 |

OTHER PUBLICATIONS

"Hierarchical Kinematic Modeling", [online], [retrieved Aug. 2, 2013], http://www.cse.ohio-state.edu/~parent/classes/888/math/DHnotation.pdf, Aug. 14, 2010.*
Merrick, et al "Skeletal Animation for the Exploration of Graphs", Proc. APVis'04, (35), pp. 61-70, 2004.*

* cited by examiner

*Primary Examiner* — Kee M Tung
*Assistant Examiner* — Patrick F Valdez
(74) *Attorney, Agent, or Firm* — Patterson + Sheridan, LLP

(57) ABSTRACT

Users may dynamically specify a "posing root" node in an animation hierarchy that is different than the model root node used to define the animation hierarchy. When a posing root node is specified, users specify the pose, including translations and rotations, of other nodes relative to the posing root node, rather than the model root node. Poses of nodes may be specified using animation variable values relative to the posing root node. Animation variable values specified relative to the posing root node are dynamically converted to equivalent animation variable values relative to the model root node, which then may be used to pose an associated model. Animation data may be presented to users relative to the current posing root node. If a posing root node is changed to a different location, the animation data is converted so that it is expressed relative to the new posing root node.

19 Claims, 7 Drawing Sheets

POSING ANIMATION HIERARCHIES WITH DYNAMIC POSING ROOTS

BACKGROUND OF THE INVENTION

The present invention relates to the field of computer graphics, and in particular to methods and apparatus for authoring and editing animation of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time.

In computer-generated animation, an object's appearance is defined by a two or three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animation software tools often rely on animation variables, which are sometimes referred to as avars, and associated animation variable functions to define the attributes of objects. Animation variable functions associate input values to a corresponding output values according to some rule, function, algorithm, or mathematical expression. To create animation, the values of animation variables may change as functions of animation time.

For example, animation variables and their associated functions can specify relatively simple motions, such as the translation and rotation of objects. For example, animation variables can specify the rotation angles of the joints of a character model, thereby positioning the character model's limbs and appendages. Animation variables and their associated functions are also used to abstract complicated modifications to a model to a relatively simple control. For example, a complicated animation variable can define the degree of opening of a character's mouth. In this example, the value of a single animation variable is provided to one or more animation variable functions to determine the positions of many different parts of the character model needed to open the characters mouth to the desired degree. In this example, animation software tools then modify the character model according to the outputs of the animation variable functions to produce a character model posed with an open mouth.

In typical animation software applications, users define computer graphics images and animated sequences by specifying the values of animation variables of an object, and hence the pose of an object, at one or more key frames. A animation variable value and its associated input value, such as an animation time or frame value, is referred to as a knot. A set of one or more knots at a given input value defined by a user or another application, such as a simulation or an inverse kinematic system, is referred to as an authored pose of an object.

Based on the authored poses of one or more objects, an animation system determines the poses of object for frames, time values, or any other type of input values where authored poses are not defined. Typically, animation systems interpolate the values of its animation variables from its knot values. A variety of different interpolation schemes are used in animation, including linear, cubic, b-spline, Bezier, and Catmull-Rom. Typically, animation tools will display the values of animation variables as a line or curve, such as a spline curve, defined by the values of one or more of its knots and the interpolation scheme.

The poses of some types of models, such as character models, may be defined using complex hierarchies of joints and other animation entities, such as deformation and simulation functions. The hierarchy of joints and other animation entities is referred to as animation hierarchy. For example, a character model can include a shoulder joint connected between a torso model and an upper arm model, an elbow joint connected between the upper arm model and a lower arm model, a wrist joint connected between the lower arm model and a hand model, and several finger joints connected between the hand model and finger models. The pose or position and orientation of all of these portions of the character model's arm is specified at least in part by the joint rotation angles and/or joint positions of the shoulder joint, the elbow joint, the wrist joint, and the finger joints.

One difficulty with posing models with complex animation hierarchies arises when a scene requires a model to be fixed or attached to an external reference point. Most animation hierarchies have a single root joint or node. The other joints or nodes in the animation hierarchy are translated and rotated relative to this root node. If the portion of the model attached to the external reference point does not correspond with the root joint of the animation hierarchy, posing and animating the model can be difficult and counter-intuitive.

For example, a scene may require a character model to be hanging by one hand from another object, such as a tree branch. In this example scene, it would be desirable for animators to specify the joint positions and rotations relative to the hand of the character model. For example, an animator might desire to specify the position and rotation of the elbow joint relative to the hand. However, if the root node of the animation hierarchy corresponds with a different portion of the model, such as the hips of the character model, then the origins or centers of rotations for joints make this type of relative positioning and rotation difficult. For example, although an animator may desire to specify the rotation of the elbow joint relative to the hand, the placement of the root node of the animator hierarchy at the hips of the character model forces the origin of the elbow joint rotation to be located in the shoulder of the character model. Thus, to achieve the example desired relative rotation of the elbow joint around the hand, prior animation systems required the animator to specify a first joint rotation angle of the elbow joint relative to the shoulder joint, a second joint rotation angle of the hand relative to the elbow joint to place the hand at the desired external point, and many other joint rotations and positions to ensure that the rest of the character model is correctly positioned and orientated with respect to the external reference point.

BRIEF SUMMARY OF THE INVENTION

Embodiments of the invention enable users to dynamically specify a "posing root" node or joint in an animation hierarchy that is different than the model root node or joint used to construct and define the animation hierarchy. When a posing root node is specified, the animator or other user may specify the translations and rotations of other joints and nodes relative to the posing root node, rather than the model root node. If a posing root node is not specified, the translations and rotations of joints and other animation entities are specified with respect to the model root node.

In an embodiment, the pose of joints may be specified using animation variable values relative to the posing root node. An embodiment of the invention dynamically converts the animation variable values specified relative to the posing root node to equivalent animation variable values relative to the model root node. These equivalent animation variable values relative to the model root node may be used to pose a model associated with the animation hierarchy. Thus, the underlying animation hierarchy is unchanged by the use of posing root nodes.

In an embodiment, animation data, such as animation variable values, are presented to users relative to the current posing root node, or the model root node if no posing root node is enabled. If a posing root node is enabled or changed to a different location, an embodiment of the invention converts the presentation of animation data so that it is expressed relative to the new posing root node. In a further embodiment, graphical user interface elements may indicate the rotation origins of joints and other entities in the animation hierarchy with respect to the current posing root node, or the model root node if no posing root node is enabled.

BRIEF DESCRIPTION OF THE DRAWINGS

The invention will be described with reference to the drawings, in which.

DETAILED DESCRIPTION OF THE INVENTION

Figure 1:
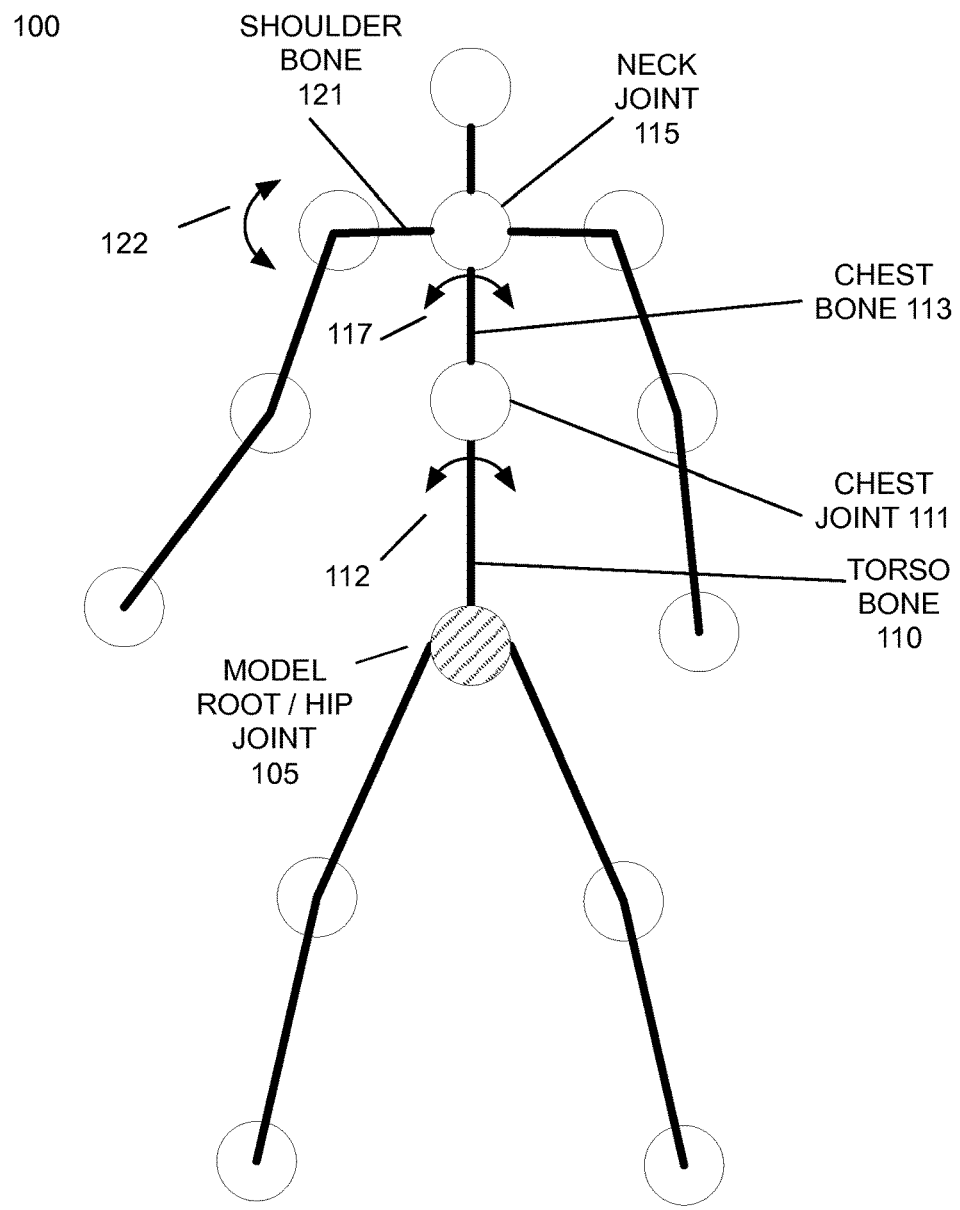
FIG. 1 illustrates an example animation hierarchy with default joint rotation origins according to an embodiment of the invention.

FIG. 1 illustrates an example animation hierarchy 100 with default joint rotation origins according to an embodiment of the invention. Example animation hierarchy 100 represents the joints and other animation entities of character model. Example animation hierarchy 100 is simplified for the purposes of illustration and typical animation hierarchies associated with character models may have hundreds or thousands of joints and other animation entities.

Example animation hierarchy 100 includes a root node, referred to as the model root node 105. The model root node 105 acts as a reference point for the posing of all other joints and animation entities in the example animation hierarchy 100. Other joints and animation entities in animation hierarchy 100 define their translations and rotations at least in part based on the model root node. The position of the model root node 105 is defined during the construction of the animation hierarchy 100 and generally cannot be changed without manually rebuilding the entire animation hierarchy. In this example animation hierarchy 100, the model root node corresponds with the hip joint of the character model. However, character models and associated animation hierarchies may be constructed with model root nodes in any arbitrary location.

In example animation hierarchy 100, the rotations and translations of other joints are defined at least in part based on the model root node 105. For example, example animation hierarchy 100 includes a torso bone 110. Torso bone 110 has a rotation origin around the model root node/hip joint 105. Thus, the rotation of torso bone 110 is defined as rotation angles with respect to the model root/hip joint 105.

In an embodiment, animators may pose the torso bone 110 by specifying translation and rotation animation variable values with respect to the model root/hip joint 105. In a further embodiment, a graphical user interface element 112 indicates the rotation direction and rotation origin for torso bone 110. In the example of FIG. 1, graphical user interface element 112 visually indicates that torso bone 110 rotates around the model root/hip joint 105.

A chest joint 111 is located at the end of torso bone 110. A chest bone 113 has a rotation origin around the chest joint 111. Thus, the rotation of chest bone 113 is defined as rotation angles with respect to the chest joint 111. In the example of FIG. 1, graphical user interface element 117 visually indicates that chest bone 113 rotates around the chest joint 111.

A neck joint 115 is located at the end of chest bone 113 in the example animation hierarchy 100. Because the model root of this example animation hierarchy 100 is located in the hip joint 105, the translations and rotations of the neck joint 115 are defined at least in part on the model root node 105. In this example, the neck joint 115 and chest bone 113 rotate and translate with respect to the chest joint 111. The chest joint 111 in turn rotates and translates relative to the model root/hip joint 105. Thus, the position and rotation of neck joint 115 is defined as one or more rotation angles with respect to the chest joint 111 and the model root/hip joint 105. Animators may pose the neck joint 115 by specifying translation and rotation animation variable values with respect to the chest joint 111 and hip joint 105.

The translations and rotations of other joints in the example animation hierarchy 100 are defined in a similar manner based on the model root node 105. For example, a shoulder bone 121 is connected with the neck joint 115 in the example animation hierarchy 100. Because the model root of this example animation hierarchy 100 is located in the hip joint 105, the position and orientation of the shoulder bone 121 are defined at least in part on the model root node 105. In this example, the shoulder bone 121 has a rotation origin around the neck joint 115. The neck joint 115 is attached to the chest bone 113, which rotates relative to the chest joint 111. The chest joint 111 is attached to the torso bone 110, which rotates relative to the model root/hip joint 105. Animators may pose the shoulder bone 121 by specifying translation and rotation animation variable values with respect to the neck joint 115. In the example of FIG. 1, graphical user interface element 122 visually indicates that shoulder bone 121 rotates around the neck joint 115.

Animators may specify translation and rotation animation variable values for joints in the example animation hierarchy 100 by entering text or numerical values for these animation variables in a table or spreadsheet format, by specifying knot values and the shapes of curves representing the animation variable values with respect to time or other domain variables, and/or by manipulating a graphical representation of the joints of the animation hierarchy 100. In a further embodiment, graphical user interface elements associated with joints, such as elements 112, 117, and 122, may be manipulated by animators using a graphical user interface to directly specify the absolute or relative positions and rotations of joints in the animation hierarchy and/or to specify the values of one or more animation variables associated with the joints.

As described above, one difficulty with posing models with complex animation hierarchies arises when a scene requires a model to be fixed or attached to an external reference point. Because the joints and nodes in the animation hierarchy are translated and rotated relative to the model root node, if the portion of the model attached to the external reference point does not correspond with the root joint of the animation hierarchy, posing and animating the model can be difficult and counter-intuitive.

To address this difficulty, embodiments of the invention enable users to dynamically specify a "posing root" node or joint in an animation hierarchy that is different than the model root node or joint used to construct and define the animation hierarchy. When a posing root node is specified, the animator or other user may specify the translations and rotations of other bones, joints and nodes relative to the posing root node, rather than the model root node. If a posing root is not specified, the translations and rotations of joints and other animation entities are specified with respect to the model root. As described in detail below, an embodiment of the invention dynamically converts the translations and rotations relative to the posing root node to animation variable values relative to the model root. Thus, the underlying animation hierarchy is unchanged by the use of posing roots.

Figure 2A:
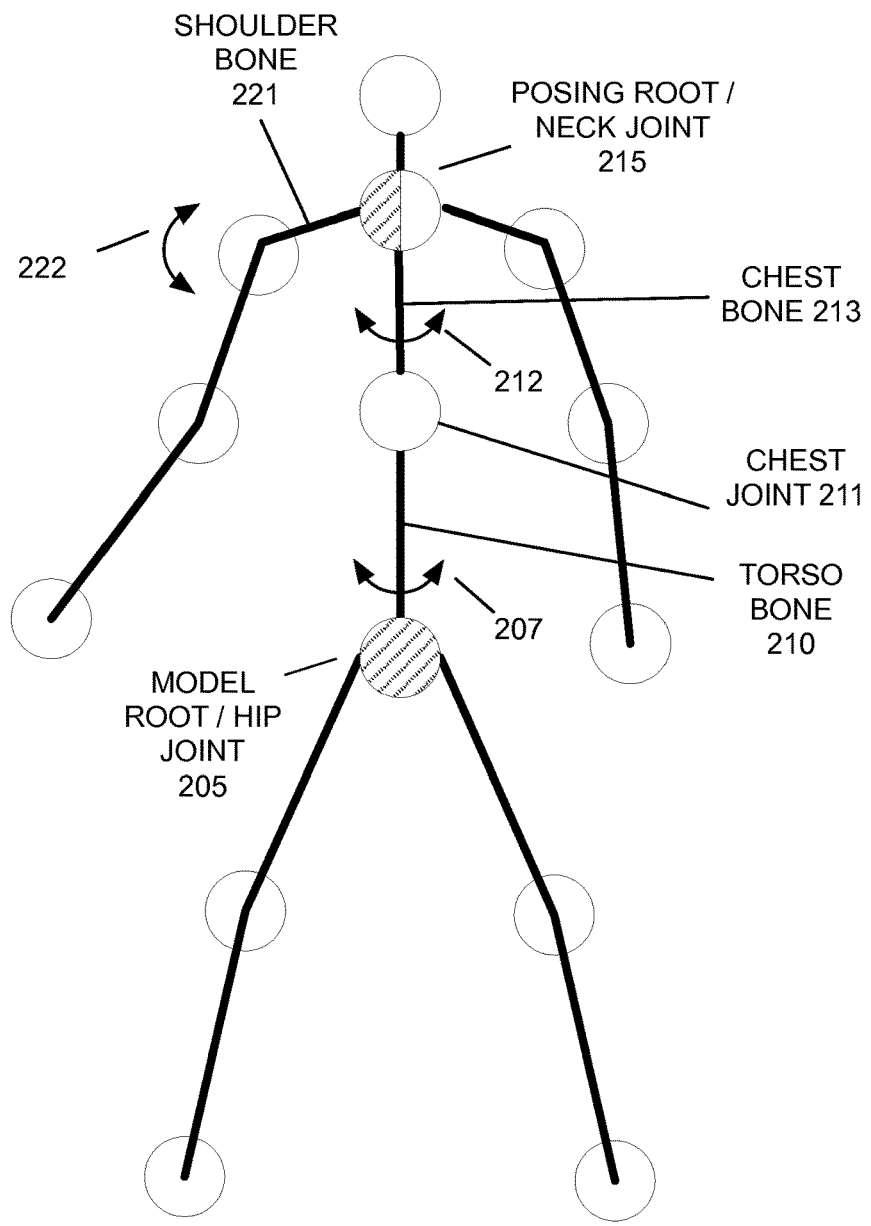
FIGS. 2A-2B illustrate the example animation hierarchy with dynamically modified joint rotation origins according to an embodiment of the invention.
Figure 2B:
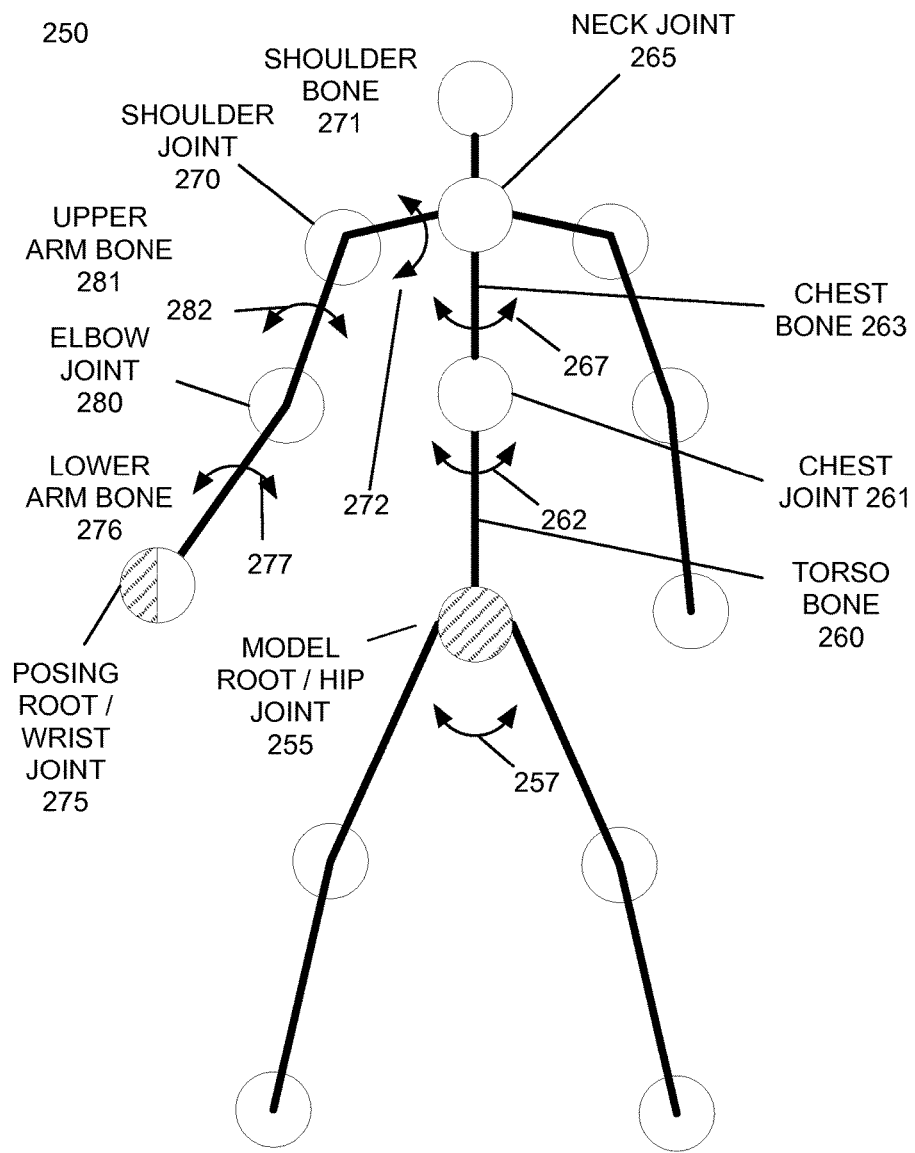

FIGS. 2A-2B illustrate the example animation hierarchy with dynamically modified joint rotation origins according to an embodiment of the invention. FIG. 2A illustrates an example animation hierarchy 200, similar to animation hierarchy 100, with a posing root according to an embodiment of the invention. In animation hierarchy 200, the neck joint 215 is designated as a posing root. As a result of this designation of the posing root 215, the other joints and bones of animation hierarchy 200 have their translations and rotations defined at least in part based on the posing root/neck joint 215.

For example, chest bone 213 has a rotation origin around posing root/neck joint 215. Thus, the rotations of chest bone 213 are defined as rotation angles with respect to the posing root/neck joint 215. Animators may pose the chest bone 213 by specifying translation and rotation animation variable values with respect to the posing root/neck joint 215. In the example of FIG. 2A, graphical user interface element 212 visually indicates that chest bone 213 rotates around the posing root/neck joint 215.

Chest joint 211 is located at the end of chest bone 213. Similarly, torso bone 210 has a rotation origin around chest joint 211. The hip joint/model root 205 is located at the end of torso bone 210. Thus, the rotations of hip joint 205 are defined as rotation angles with respect to the torso bone 210. Animators may pose the hip joint 205 by specifying translation and rotation animation variable values for the chest joint 211 to pose the torso bone 210. The chest joint 211 is posed by specifying translation and rotation animation variables for the chest bone 213 with respect to the posing root/neck joint 215. In the example of FIG. 2A, graphical user interface element 207 visually indicates that torso bone 210 rotates around the chest joint 211. In this example, hip joint 205 is the model root of animation hierarchy 200. If the neck joint 215 was not designated as the posing root, then the entire animation hierarchy 200 would rotate around hip joint 205.

It should be noted that designating neck joint 215 as the posing root of animation hierarchy 200 changes the rotation origins of some joints and bones. For example, without the use of a posing root, as shown in animation hierarchy 100 in FIG. 1, torso bone 110 rotates around model root/hip joint 105 and chest bone 113 rotates around chest joint 111, because of the location of the model root. By way of comparison, the use of posing root 215 at the neck joint of animation hierarchy overrides the default joint rotation origins defined by the model root. Instead, as shown in FIG. 2A, torso bone 210 rotates around chest joint 211 and chest bone 213 rotates around neck joint 215. The model root/hip joint 205, which by default does not rotate around any other joints in the animation hierarchy, rotates around the chest joint 211 because of the posing root in the neck joint 215.

Typically, the posing root changes the rotation origins of joints in an animation hierarchy located between the posing root and the model root. Joints in the animation hierarchy that are not between the posing root and model root are typically unchanged.

For example, shoulder bone 221 has a rotation origin around posing root/neck joint 215. Thus, the rotations of shoulder bone 221 are defined as rotation angles with respect to the posing root/neck joint 215. Animators may pose the shoulder bone 221 by specifying translation and rotation animation variable values with respect to the posing root/neck joint 215. In the example of FIG. 2A, graphical user interface element 222 visually indicates that shoulder bone 221 rotates around the posing root/neck joint 215. Although the rotation and translation of shoulder bone 221 are based on the posing root in neck joint 215, rather than the model root in the hip joint, shoulder bone 221 rotates around neck joint 215, which is unchanged from the default rotation of shoulder bone 121 in animation hierarchy 100.

Animators can specify the joint rotation angles of joints or other parameters or properties of a model directly to define a pose of a character model with respect to the model root and/or posing roots. This is referred to as forward kinematics.

Animators may also use inverse kinematics to pose models with respect to the model root and/or posing roots. With inverse kinematics systems, animators specify desired joint positions for only a portion of the joints or other desired characteristics of all or a portion of a model. The animation tools then determine the specific joint rotation angles, joint positions, and other parameters, such as scaling or shearing, for the other joints required to achieve this pose. For example, an animator may specify that the hand of character model should contact another object in a scene. The animation tools then calculate the joint rotation angles for the shoulder, elbow, and wrist joints necessary for the hand to contact the object as specified. Animation tools often take into account constraints, such as limits on the range of joint rotations, to ensure that the final pose of the model appears realistic. For example, an elbow joint may be constrained to a range of 150 degrees of rotation to prevent the animation tools from setting this joint's rotation angles outside of the range of motion possible in human anatomy.

Similarly, FIG. 2B illustrates an example animation hierarchy 250, similar to animation hierarchies 100 and 200, with a posing root according to an embodiment of the invention. In animation hierarchy 250, the wrist joint 275 is designated as a posing root. As a result of this designation of the posing root 275, the other joints of animation hierarchy 250 have their translations and rotations defined at least in part based on the posing root/wrist joint 275.

For example, lower arm bone 276 has a rotation origin around posing root/wrist joint 275. Thus, the rotations of the lower arm bone 276 are defined as rotation angles with respect to the posing root/wrist joint 275.

An elbow joint 280 is located at the end of the lower arm bone 276. When the posing root is located at the wrist joint 275, the upper arm bone 281 has a rotation origin around elbow joint 280. Thus, the rotations of the upper arm bone 281 are defined as rotation angles with respect to the elbow joint 280 when the posing root is located at the wrist joint 275.

Similarly, shoulder joint 270 is located at the end of the upper arm bone 281. Shoulder bone 271 has a rotation origin around shoulder joint 270. Thus, the rotations of shoulder bone 271 are defined as rotation angles with respect to the shoulder joint 270.

Neck joint 265 is located at the end of shoulder bone 271. Chest bone 263 has a rotation origin around neck joint 265. Thus, the rotations of chest bone 263 are defined as rotation angles with respect to the neck joint 265.

Chest joint 261 is located at the end of chest bone 263. Torso bone 260 has a rotation origin around chest joint 261. Thus, the rotations of torso bone 260 are defined as rotation angles with respect to the chest joint 261.

The model root/hip joint 255 is located at the end of the torso bone 260. Without the posing root, the position and orientation of the model root/hip joint 255 is specified directly. However, when the posing root is located at the wrist joint 275, the position and orientation of the model root/hip joint 255 is specified using the joint rotation and translation values for all of the joints between the posing root and the model root. Thus, in this example 250, the position and orientation of the hip joint/model root 255 depends on the rotation angles of the wrist joint 275, elbow joint 280, shoulder joint 270, neck joint 265, and chest joint 261.

FIG. 2B includes graphical user interface elements 277, 282, 272, 267, 262, and 257 to indicate the rotation origins of bones 276, 281, 271, 263, and 260, respectively.

In a further embodiment, users may specify any arbitrary location in an animation hierarchy as a posing root. Users may select the posing root using an animation software application, for example via a graphical user interface. Additionally, users may change the location of the posing root during the authoring of animation at any arbitrary animation time or disable the posing root and specify animation data based on the model root. As described below, an embodiment of the invention changes the presentation of animation data as the posing root is changed while maintaining the intended poses previously specified with different posing roots and/or the model root.

Figure 3A:
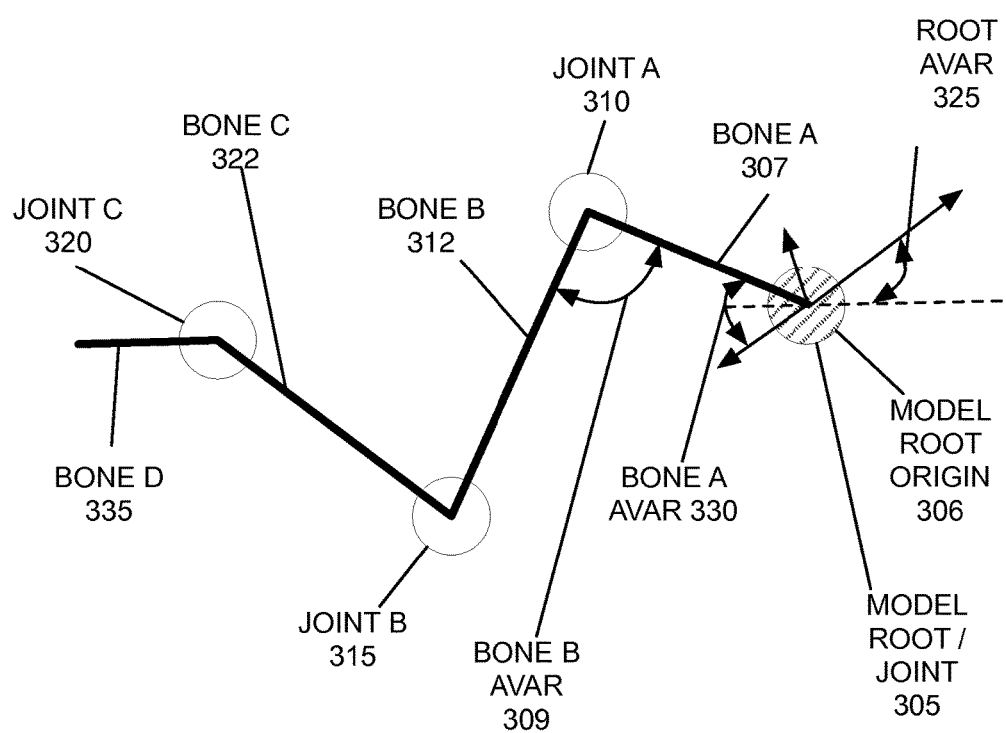
FIGS. 3A-3B illustrate example changes in animation variable values with respect to the posing root and the model root according to an embodiment of the invention.
Figure 3B:
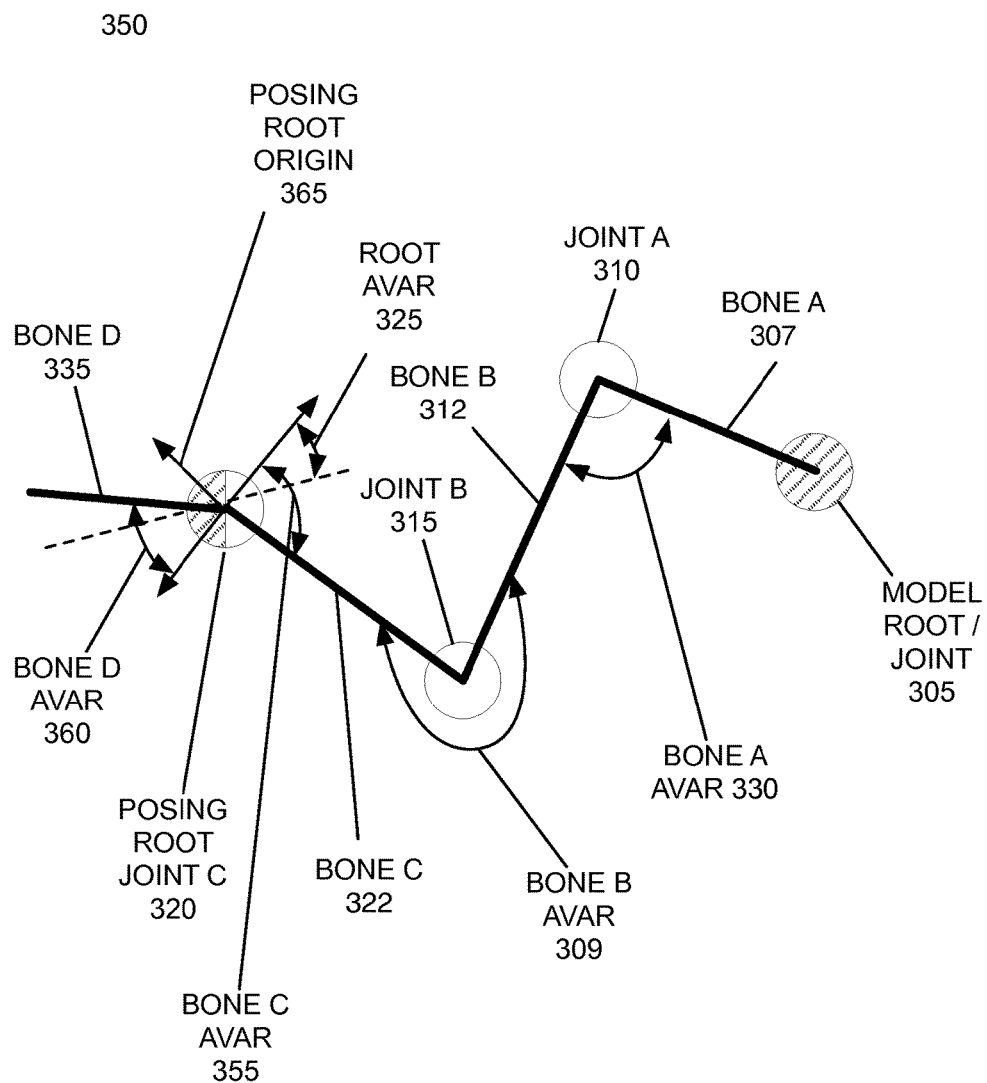

Embodiments of the invention enable users to specify joint translations and rotations with respect to the posing root, in addition to or instead with respect to the model root. FIGS. 3A-3B illustrate example changes in animation variable values with respect to the posing root and the model root according to an embodiment of the invention. FIG. 3A illustrates an example animation hierarchy 300 including a model root at joint 305 and additional joints A 310, B 315, and C 320. Example animation hierarchy 300 also includes bones A 307, B 312, C 322, and D 335.

When the model root is used to specify animation data, animation variable values such as joint rotations are specified with respect to the model root. First, the model root may be posed with respect to the surrounding environment using at least model root animation variable (or avar) 325. Additionally, bone A 307 connected with the model root 305 may be rotated with respect to the model root using bone A animation variable 330. In this example, a model root coordinate origin 306 defines the rotation of the model root 305 with respect to the world and/or the rotation of bone A 307 with respect to the model root 305.

The animation variables values for intermediate bones are also specified based on the model root. In this example, the rotation of bone B 312 is specified at least in part by animation variable B 309. When the animation hierarchy 300 is posed with respect to the model root, animation variable B 309 specifies the angle of rotation of bone B 312 with respect to joint A 310.

When the posing root is used to specify animation data, the animation variable values are changed so that joint translations and rotations are specified with respect to the posing root, rather than the model root. FIG. 3B illustrates an example 350 of the same animation hierarchy where a posing root has been added. In example 350, joint C 320 has been designated as the posing root. As with the previous example 300, the rotation of bone B 312 is defined by animation variable B 309. However, animation variable B 309 now defines the rotation of bone B 312 with respect to joint B 315, rather than joint A 310 as in example 300.

In example 300, the animation variable B 309 specifies the rotation of bone B 312 around joint A 310. In example 350, because of the use of the posing root at joint C 320, the animation variable B 309 specifies the rotation of bone B 312 around joint B 315. Because of this change in the rotation origin of bone B 312, the use of a posing root changes the meaning of the animation variable values, even though the underlying animation hierarchy is unchanged.

Similarly, because of the selection of joint C 320 as the posing root in example 350, the posing root 320, rather than the model root 305, may be posed with respect to the surrounding environment using at least posing root animation variable 355. In embodiments of the invention, the posing root animation variable 355 may be different than the model root animation variable 325 or alternatively be the same as the model root animation variable 325. In the latter embodiment, the model root animation variable 325 normally used to pose the model root with respect to the world are applied to the posing root. Additionally, bone C 322 connected with the posing root 320 may be rotated with respect to the posing root using bone D animation variable 360. In this example, a posing root coordinate origin 365 defines the rotation of the posing root/joint C 320 with respect to the world.

In an embodiment, an animation software application displays animation variable values to users with respect to the current posing root (or the model root if no posing root is enabled). If the posing root is enabled or changed, the animation software application updates the displayed animation variable values so that they are defined with respect to the new posing root. If the posing root is disabled, the animation software application updates the displayed animation variable values so that they are defined with respect to the model root. The animation variable values may be displayed in numerical and/or graphical form (such as curves representing animation variable values with respect to animation time). An additional embodiment of an animation software application also updates graphical user interface elements associated with joints and other animation entities to indicate their respective rotation origins when a posing root is enabled, disabled, or changed.

In a further embodiment, an animation software application maintains two or more values for each knot representing an animation variable value at a given animation time. The use of a knot with two or more values for each time value facilitates the use of dynamic posing roots that may be changed by users. In this embodiment, the animation software application stores at least two animation variable values for each knot. A first animation variable value of each knot represents the value of this animation variable with respect to the model root and is referred to as the model animation variable value. Each knot also includes at least a second animation variable value referred to as the posing animation variable value. The posing animation variable value specifies the animation variable value of a knot with respect to the current posing root, if any.

Users may specify animation variable values for each knot using the model animation variable value and/or the posing animation variable value. If the user specifies a knot of an animation variable with respect to a posing root, an embodiment of the animation software application stores this knot value as the posing animation variable value. An embodiment of the animation system then determines the corresponding model animation variable value for this knot. If a user enables or changes the posing root, an embodiment of the animation software application converts each knot's posing animation variable value to a new corresponding posing animation variable value for presentation to the user and optionally further modification.

Figure 4:
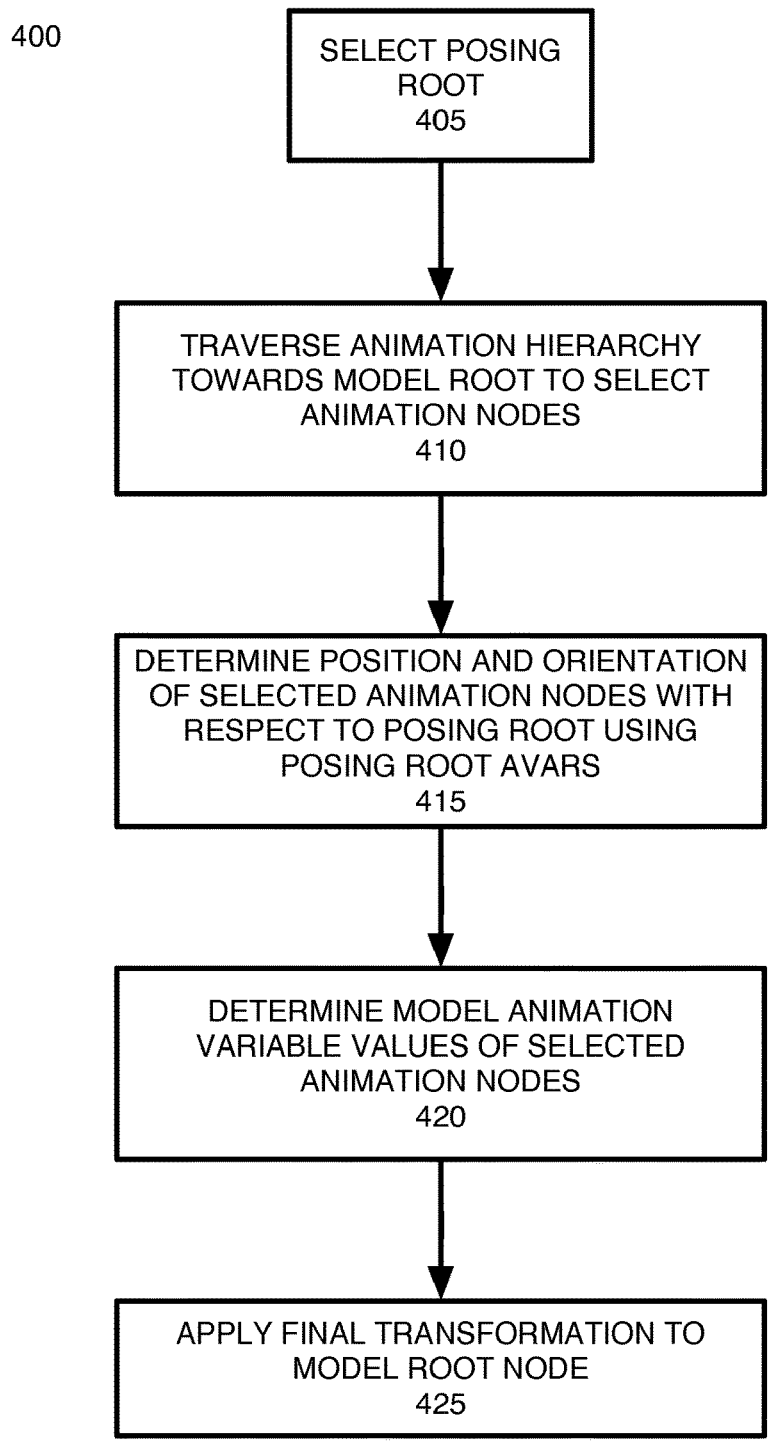
FIG. 4 illustrates a method of posing an animation hierarchy with dynamically modified joint rotation origins according to an embodiment of the invention.

FIG. 4 illustrates a method 400 of posing an animation hierarchy with dynamically modified joint rotation origins according to an embodiment of the invention. Method 400 may be invoked when a user enables or changes a posing root and/or when a user poses a joint or other animation entity with respect to a posing root, rather than the model root.

Step 405 selects the posing root as an initial position in the animation hierarchy for evaluation. Step 410 traverses the animation hierarchy from the posing root towards the model root to select all of the animation nodes, including joints and bones, between the posing root and the model root as well as the posing root and model root.

Step 415 determines the positions of the selected animation nodes with respect to the posing root. In an embodiment, step 415 determines the positions of the selected animation nodes with respect to the posing root by traversing the selected animation nodes in order from the posing root. For each animation node, step 415 applies the animation variable values specified with respect to the previous animation node in this traversal order to determine the position and orientation of the current animation node. The application of these animation variable values to the position and orientation of the previous animation node (with respect to the posing root) specifies the position and orientation of the current animation node with respect to the posing root.

Step 420 determines the model animation variable values for the selected animation nodes in the animation hierarchy. In an embodiment, step 420 traverses the selected animation nodes from the model root to posing root. For each animation node, step 420 decomposes the rotations between each pair of adjacent bones to determine the model animation variables. The corresponding model animation variable value is stored in association with its knot for later use if the posing root changes or is disabled and optionally for posing a model associated with the animation hierarchy.

Step 425 determines a final transformation of the model root node. This final transformation positions the model root node at an absolute position based on the desired absolute position and rotation of the posing root node and any intervening nodes' poses with respect to the posing root node.

Following method 400, the posing and/or model animation variable values may be presented to a user in an animation software application for use in viewing the pose and optionally an animation of animation hierarchy and associated model, modifying the animation variable knots of one or more nodes, and/or authoring new animation variable knots. Method 400 may be repeated for multiple animation variable knots and/or posing roots. Animation variable knots may be created and modified using posing animation variable values and/or model animation variable values, depending on the preferences of users and the requirements of scenes. In a further embodiment, regardless of whether animation variable knots are authored using posing animation variable values or model animation variable values, the model associated with the animation hierarchy is posed using the model animation variable values of each knot. This enables the animation software application to use only one animation hierarchy for each model, regardless of the number of different posing roots used to author animation data.

In an embodiment, animation variable values are stored as knots relative to their defined posing root. In this embodiment, animation variable values stored relative to their defined posing root are converted to model animation variable values for posing the animation hierarchy and associated computer graphics model. In a further embodiment, a posing root may be specified for a specified range of animation time, such that all animation variable knots specified within this time range are defined in terms of the posing root. Different posing roots may be specified for different ranges of animation times.

Embodiments of the invention may convert animation variable values expressed with respect to one posing root to equivalent animation variable values expressed with respect to a different posing root. In these embodiments, a method similar to method 400 may be used to convert animation variable values from one posing root to a second posing root, where the second posing root is used in place of the model root in this method.

Figure 5:
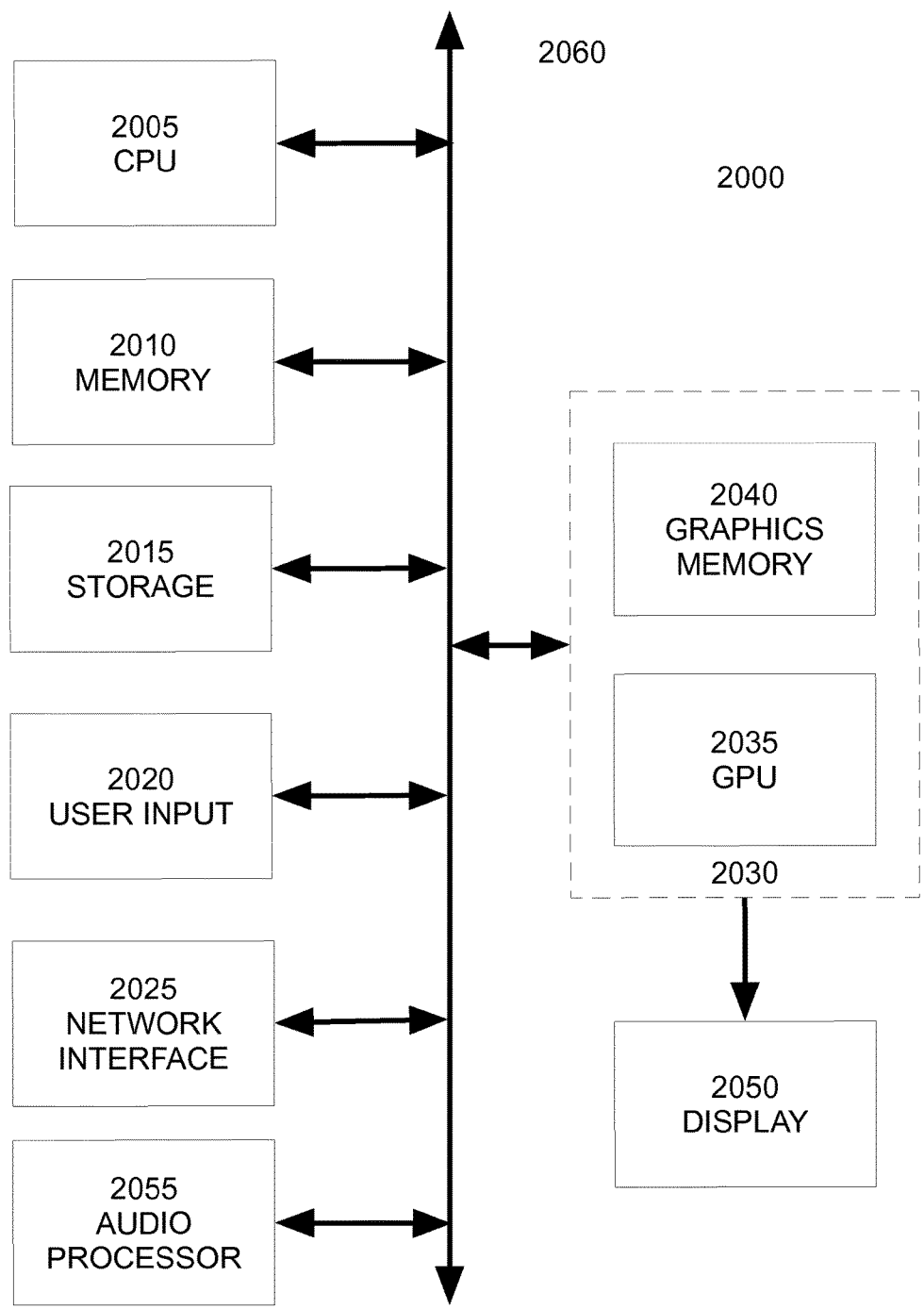
FIG. 5 illustrates a computer system suitable for use in implementing embodiments of the invention.

FIG. 5 illustrates a computer system 2000 suitable for use in implementing embodiments of the invention. FIG. 5 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet and cellular communications networks. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, C P U 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable medium including instructions adapted to direct a processor to perform an operation, the operation comprising:
   receiving an animation hierarchy including a model root node and animation nodes, wherein each animation node is associated with at least one animation variable specifying at least one of a position and an orientation of the animation node relative to the model root node, wherein the node in the animation hierarchy designated as the model root node is fixed;
   receiving a selection of a first animation node of the animation nodes as a posing root node;
   selecting only a portion of the animation nodes between the posing root node and the model root node; and
   changing, in response to the selection of the posing root node, a value of the animation variable for each node of the selected portion of the animation nodes, wherein the changed values specify at least one of the positions and the orientations of the selected portion of the animation nodes relative to the posing root node and not the model root node, wherein the animation variable value for a second animation node of the selected portion specifies a rotation angle between the second animation node and a third animation node of the selected portion, wherein the third animation node is closer to the posing root node than the second animation node,
   wherein values of the animation variables for the remaining animation nodes in the animation hierarchy are unchanged in response to the selection of the posing root node.

2. The non-transitory computer readable medium of claim 1, determining a final transformation of the model root node to pose the animation hierarchy relative to an absolute pose of the posing root node.

3. The non-transitory computer readable medium of claim 1, comprising:
   posing a computer graphics model associated with the animation hierarchy using the values of the animation variables.

4. The non-transitory computer readable medium of claim 1, comprising:
   presenting the values of the animation variables to an output device.

5. The non-transitory computer readable medium of claim 1, comprising:
   receiving a selection of a fourth one of the animation nodes as a second posing root node; and
   in response to receiving the selection of the fourth animation node as the second posing root node, changing a value of the animation variable for a fifth animation node of the selected portion, wherein the changed value of the animation variable for the fifth animation node specifies at least one of a position and an orientation of the fifth animation node relative to the second posing root node.

6. The non-transitory computer readable medium of claim 5, comprising:
presenting the changed value of the animation variable of the fifth animation node to an output device.

7. The non-transitory computer readable medium of claim 5, comprising:
prior to receiving the selection of the fourth one of the animation nodes as the second posing root node, presenting a first graphical user interface element adapted to indicate a rotation origin of the fifth animation node based on the posing root node; and
in response to receiving the selection of the fourth animation node as the second posing root node, presenting a second graphical user interface element adapted to indicate a rotation origin of the fifth animation node based on the second posing root node.

8. The non-transitory computer readable medium of claim 1, comprising:
storing the animation variables for the selected portion of the animation nodes in association with respective animation time values as a control knot defining at least a portion of at least one of the position and the orientation of the selected portion of the animation nodes as a function of animation time.

9. The non-transitory computer readable medium of claim 8, comprising:
storing the animation variables for the selected portion of the animation nodes in association with at least one of the animation time values as a second value of the control knot defining at least the portion of at least one of the position and the orientation of the selected portion of the animation nodes as the function of animation time.

10. The non-transitory computer readable medium of claim 1, wherein the values of the animation variables are received from a forward kinematics animation software module.

11. The non-transitory computer readable medium of claim 1, wherein the values of the animation variables are received from an inverse kinematics animation software module.

12. A non-transitory computer readable medium including instructions adapted to direct a processor to perform an operation, the operation comprising:
presenting an animation hierarchy to a user, wherein the animation hierarchy includes a model root node and animation nodes, wherein each animation node is associated with an animation variable value specifying at least one of a position and an orientation of the animation node relative to the model root node, wherein the animation node in the animation hierarchy designated as the model root node is fixed;
receiving a selection of a first animation node of the animation nodes as a posing root node;
upon determining that a second animation node of the animation nodes is between the posing root node and the model root node, changing, in response to the selection of the posing root node, a value of the animation variable for the second animation node, wherein the changed value specifies at least one of the position and the orientation of the second animation node relative to the posing root node and not the model root node, and wherein the changed value of the animation variable for the second animation node specifies a rotation angle between the second animation node and a third one of the animation nodes, wherein the third animation node is closer to the posing root node than the second animation node,
wherein the values of the animation variables for the animation nodes not between the posing root node and the model root node are unchanged in response to the selection of the posing root node; and
creating a presentation of the values of the animation variables for display to the user.

13. The non-transitory computer readable medium of claim 12, wherein the presentation includes the values of the animation variables in numerical form.

14. The non-transitory computer readable medium of claim 12, wherein the presentation includes the values of the animation variables in graphical form.

15. The non-transitory computer readable medium of claim 12, comprising:
prior to receiving the selection of the first animation node as the posing root node, presenting a first graphical user interface element adapted to indicate a rotation origin of the second animation node based on the model root node to the user; and
in response to receiving the selection of the first animation node as the posing root node, presenting a second graphical user interface element adapted to indicate a rotation origin of the second animation node based on the posing root node to the user.

16. The non-transitory computer readable medium of claim 12, comprising:
determining a model animation variable value for the second animation node, wherein the model animation variable value specifies a new position of the second animation node relative to the model root node.

17. A method of posing a computer graphics model, the method comprising:
receiving an animation hierarchy including a model root node and animation nodes, wherein each animation node is associated with at least one animation variable specifying at least one of a position and an orientation of the animation node relative to the model root node, wherein the node in the animation hierarchy designated as the model root node is fixed;
receiving a selection of a first animation node of the animation nodes as a posing root node;
upon determining that a second animation node of the animation nodes is between the posing root node and the model root node, changing, in response to the selection of the posing root node, a value of the animation variable for the second animation node, wherein the changed value specifies at least one of the position and the orientation of the second animation node relative to the posing root node and not the model root node, and wherein the changed value of the animation variable for the second animation node specifies a rotation angle between the second animation node and a third one of the animation nodes, wherein the third animation node is closer to the posing root node than the second animation node,
wherein the values of the animation variables for the animation nodes not between the posing root node and the model root node are unchanged in response to the selection of the posing root node;
posing the computer graphics model associated with the animation hierarchy using the animation variables for the animation nodes; and
rendering a computer graphics image including the posed computer graphics model.

18. A method of posing a computer graphics model, the method comprising:
- presenting an animation hierarchy to a user, wherein the animation hierarchy includes a model root node and animation nodes, wherein each animation node is associated with at least one model animation variable value specifying at least one of a position and an orientation of the animation node relative to the model root node, wherein the animation node in the animation hierarchy designated as the model root node is fixed;
- receiving a selection of a first animation node of the animation nodes as a posing root node;
- changing, in response to the selection of the posing root node, a value of the animation variable for a second animation node of the animation nodes, wherein the second animation node is between the posing root node and the model root node in the animation hierarchy, wherein the changed value specifies at least one of the position and the orientation of the second animation node relative to the posing root node and not the model root node, and wherein the changed value of the animation variable for the second animation node specifies a rotation angle between the second animation node and a third one of the animation nodes, wherein the third animation node is closer to the posing root node than the second animation node,
- wherein the values of the animation variables for the animation nodes not between the posing root node and the model root node in the animation hierarchy are unchanged in response to the selection of the posing root node; and
- creating a presentation of the values of the animation variables for display to the user.

19. A non-transitory medium including at least one computer-generated image, wherein the computer-generated image is created using a process comprising:
- receiving an animation hierarchy including a model root node and animation nodes, wherein each animation node is associated with at least one model animation variable specifying a position of the animation node relative to the model root node, wherein the animation node in the animation hierarchy designated as the model root node is fixed;
- receiving a selection of a first animation node of the animation nodes as a posing root node;
- changing, in response to the selection of the posing root node, a value of the animation variable for a second animation node of the animation nodes, wherein the second animation node is between the posing root node and the model root node in the animation hierarchy, wherein the changed value specifies at least one of the position and the orientation of the second animation node relative to the posing root node and not the model root node, and wherein the changed value of the animation variable for the second animation node specifies a rotation angle between the second animation node and a third one of the animation nodes, wherein the third animation node is closer to the posing root node than the second animation node,
- wherein the values of the animation variables for the animation nodes not between the posing root node and the model root node in the animation hierarchy are unchanged in response to the selection of the posing root node;
- posing a computer graphics model associated with the animation hierarchy using at least the values of the animation variables; and
- rendering the computer-generated image including the posed computer graphics model.

* * * * *